United States Patent

Simar

[19]

[11] Patent Number: 6,082,017
[45] Date of Patent: Jul. 4, 2000

[54] MAGNETIC TAPE MEASURE ASSEMBLY WITH A DEPLOYMENT WARNING SYSTEM

[76] Inventor: Bryan D. Simar, 3291 Bankhead, Hwy. #19, Lith ia Springs, Ga. 30057

[21] Appl. No.: 09/052,568

[22] Filed: Mar. 31, 1998

[51] Int. Cl.[7] ................................................. G01B 3/10
[52] U.S. Cl. ................................ 33/755; 33/758; 33/768; 33/DIG. 1; 116/67 R; 242/912
[58] Field of Search .............................. 33/755, 758, 759, 33/760, 761, 768, 769, 770, DIG. 1; 116/67 R; 242/912, 305, 306

[56] References Cited

U.S. PATENT DOCUMENTS

| | | |
|---|---|---|
| 736,052 | 8/1903 | Adamson . |
| 1,380,184 | 5/1921 | Brandenburg ............................. 33/758 |
| 1,438,903 | 12/1922 | Crogan ....................................... 33/758 |
| 1,646,826 | 10/1927 | Langsner .................................... 33/758 |
| 2,663,941 | 12/1953 | Dart ............................................ 33/768 |
| 2,711,030 | 6/1955 | Drew et al. ................................ 33/758 |
| 3,036,791 | 5/1962 | Siggelkow ................................. 33/758 |
| 3,100,937 | 8/1963 | Burch ......................................... 33/770 |
| 3,145,477 | 8/1964 | Morrison ................................... 33/770 |
| 3,662,471 | 5/1972 | Lynde ........................................ 33/770 |
| 4,924,597 | 5/1990 | Tursi .......................................... 33/758 |
| 5,035,064 | 7/1991 | Care ........................................... 33/760 |
| 5,253,655 | 10/1993 | Stone et al. ............................... 33/755 |
| 5,440,820 | 8/1995 | Hwang ...................................... 33/761 |
| 5,458,946 | 10/1995 | White, Jr. .................................. 33/758 |
| 5,481,813 | 1/1996 | Templeton ................................. 33/770 |

FOREIGN PATENT DOCUMENTS

| | | | |
|---|---|---|---|
| 155903 | 8/1985 | Japan | ....................................... 33/758 |

*Primary Examiner*—Christopher W. Fulton
*Attorney, Agent, or Firm*—Kenneth L Tolar

[57] ABSTRACT

The present invention relates to a tape measure assembly having an internal deployment warning system therein. The device includes a substantially hollow housing having a top wall, a bottom wall, an end wall and a front wall with a horizontal slot between the front wall and the bottom wall. A tape measure having a plurality of marking indicia thereon extends through the horizontal slot and is selectively retractable within and extendable from the housing interior using conventional means currently used in various tape measuring devices. A first magnet is attached to the bottom wall of the housing for securing the housing to a metallic surface. A second magnet is removably attached to the top wall of the housing and has a slit thereon for selectively receiving an L-shaped catch member at a first end of the tape measure. Received within the housing adjacent an edge of the tape measure is a spring biased ratcheting pawl for selectively engaging a plurality of longitudinally aligned apertures proximal a second end of the tape measure. Accordingly, when the tape measure has been extended to a predetermined length, the ratcheting pawl will emit a clicking noise thereby audibly alerting a user that the tape is approaching its maximum length.

7 Claims, 2 Drawing Sheets

MAGNETIC TAPE MEASURE ASSEMBLY WITH A DEPLOYMENT WARNING SYSTEM

BACKGROUND OF THE INVENTION

The present invention relates to a tape measure, and more specifically, a tape measure assembly having magnets attached thereto for securing the assembly to a metallic surface and further including an internal deployment warning system for alerting a user that the tape has been extended beyond a predetermined length.

DESCRIPTION OF THE PRIOR ART

Retractable tape measures are used by carpenters, welders, framers and similar construction workers for measuring and marking various building materials. The L-shaped terminal end of the tape is secured to an end of an object to be measured and the housing is pulled to extend the tape. While holding the housing with one hand, the worker may then mark the measured item at a desired location. Such a practice is cumbersome and inconvenient since the L-shaped terminal end will often slip from the end of the item being measured. Also, it is often necessary for the worker to use both hands which is not possible with conventional tape measures since the worker must pull or fix the housing with one hand while measuring or marking with the other.

In addition, conventional tape measures include a retraction mechanism which typically relates to a spool with the end of the tape opposite the L-shaped terminal end attached thereto. The spool is biased such that when the user releases the tape, the spool will automatically retract the tape within the housing. However, if the tape is extended beyond a predetermined length, the tape may be detached from the spool thereby ruining the device.

Various devices for securing a tape measure or a tape measure housing have been heretofore designed. For example, U.S. Pat. No. 5,458,946 issued to White, Jr. relates to a cap like retainer attachable to the terminal end of a tape measure for receiving the end of an object to be measured.

U.S. Pat. No. 3,036,791 issued to Siggelkow discloses a tape or chalk line having a magnetic holder. The magnetic holder relates to a pair of magnets received within the tape housing for magnetically securing the housing to a metallic surface.

U.S. Pat. No. 1,646,826 issued to Langsner relates to a measuring tape having an anchor on an end thereof. The anchor has a pair of prongs for penetrating an object.

U.S. Pat. No. 1,438,903 issued to Crogan discloses a terminal for a tape that may be attached to a variety of objects. The terminal includes a ring for receiving an object to be measured.

U.S. Pat. No. 1,380,184 issued to Brandenburg relates to an attachment for tape measures allowing it to be attached to a fixed object. The attachment includes a spur having a shanked arm pivotally attached to a loop for penetrating a surface such as wood.

U.S. Pat. No. 4,924,597 issued to Tursi discloses a tape measure having a magnet on its base and a removably attached suction cup allowing it to be selectively attached to a variety of surfaces. The device further includes a second permanent magnet attached to the terminal end of the tape measure for the securing it to a ferro-magnetic surface.

Although several tape measure retaining devices including magnets exist in the prior art, these devices have several drawbacks. None of the above described devices disclose a means for preventing the tape from being detached from its spool as discussed above. The present invention provides a tape measure assembly having an internal deployment warning system for audibly alerting a user when the tape has been extended beyond a predetermined distance. Additionally, the housing according to the present invention has a first magnet permanently attached thereto and a second removably attached magnet specifically configured to receive the terminal end of the tape allowing both the housing and the tape to each be magnetically secured to an object being measured.

SUMMARY OF THE INVENTION

The present invention relates to a tape measure assembly comprising a substantially hollow housing having a bottom wall, a top wall, an end wall and a front wall with a horizontal slot between the front wall and the bottom wall. An elongated tape measure having a plurality of measurement indicia thereon is selectively extendable from the housing through the horizontal slot. The housing, tape measure and retraction assembly are of the type generally known in the prior art. Permanently attached to the bottom wall of the housing is a magnet allowing the housing to be secured to a metallic surface. Removably attached to the top wall of the housing is a second magnet having a slit on an intermediate portion thereof for selectively receiving an L-shaped catch member on a first end of the tape. A second end of the tape is permanently secured to the retraction mechanism in a similar manner as conventional tape measures. Received within the housing proximal a side edge of the tape is a ratcheting pawl mechanism including a spring biased arm having a tip portion thereon. At a predetermined distance from the second end of the tape are a plurality of longitudinally aligned apertures each for selectively receiving the tip portion of the spring biased arm. As the tape is extended to a length approaching its second end, the arm will reciprocate as it successively seats within and is displaced from each of the apertures whereby the ratcheting mechanism will emit a clicking noise audibly notifying the user that the tape is approaching its endpoint. It is therefore an object of the present invention to provide a tape measure received within a housing which may be magnetically secured to a metallic surface.

It is yet another object of the present invention to provide a tape measure having a removably attached retaining device for magnetically securing an end of the tape measure to a metallic surface.

It is yet another object of the present invention to provide a tape measure having an internal deployment warning device which audibly alerts a user when the tape has been extended beyond a predetermined length. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
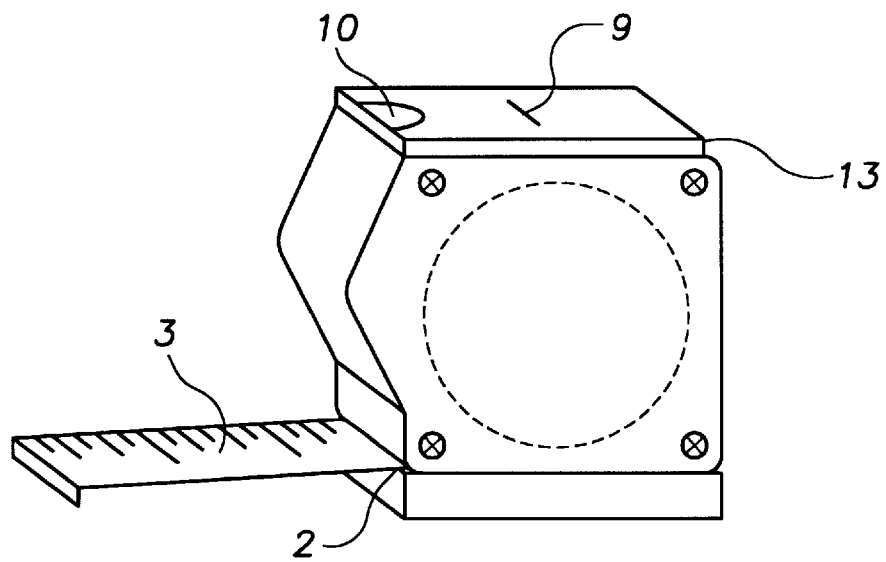
FIG. 1 is a perspective view of the inventive device.
Figure 2:
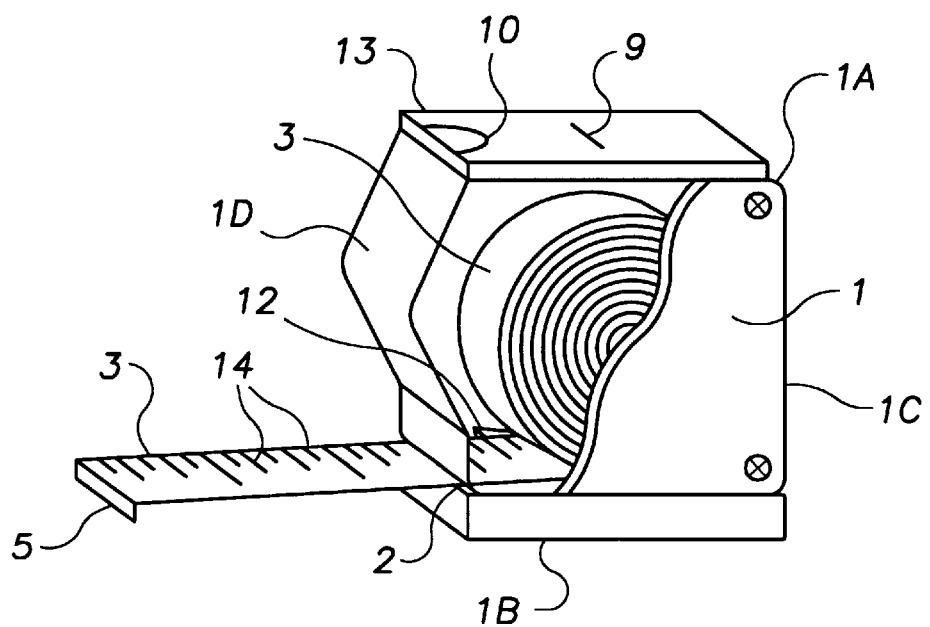
FIG. 2 depicts the inventive device and the internal components.
Figure 3:
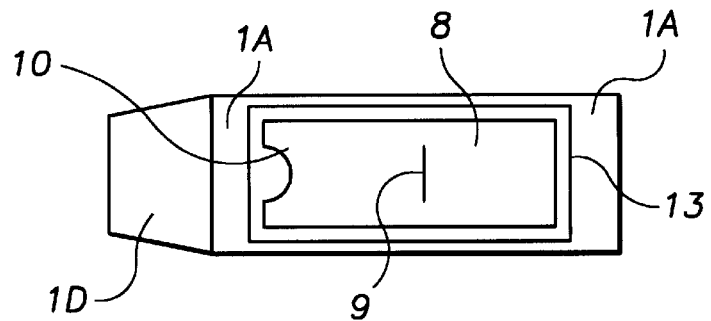
FIG. 3 is a top view of the housing.
Figure 4:
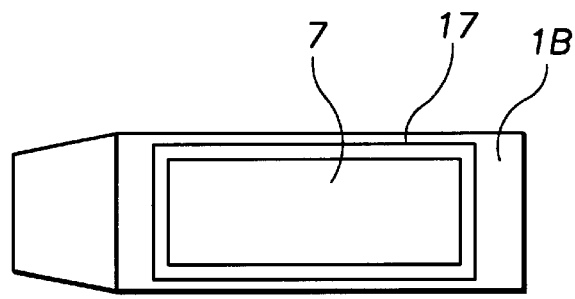
FIG. 4 is a bottom view of the housing.
Figure 5:
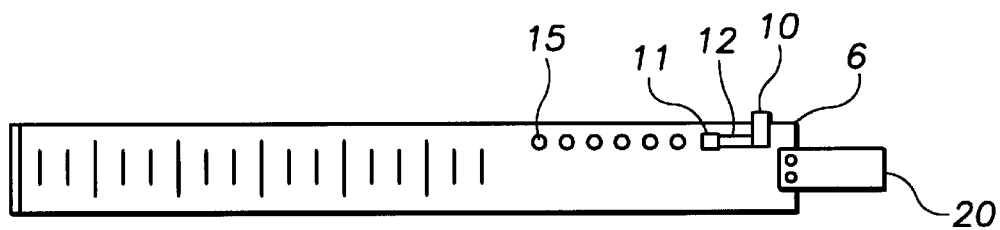
FIG. 5 depicts the deployment warning device according to the present invention.

Referring now to FIGS. 1 through 5, the present invention relates to a tape measure assembly comprising a housing 1 having a top wall 1A, a bottom wall 1B, an end wall 1C, a pair of side walls and a front wall 1D. Between the front wall and the bottom wall is a horizontal slot 2 through which a tape measure may be selectively extended from the housing. The tape measure 3 is scrollably received within the housing and is selectively extendable or retractable therefrom using means of the type generally known in the prior art pertaining to conventional retractable tape measures.

The tape measure 3 has a first end, a second end, an upper surface and a pair of opposing side edges. The upper surface has a plurality of measurement indicia 14 thereon. A first end of the tape has an L-shaped catch member 5 thereon for securing the tape to an end of an object to be measured. The second end 6 of the tape is secured to the retraction means within the housing using conventional attachment means such as a band 20 or strap.

Attached to the bottom wall 1B of the housing is a magnet 7 for selectively securing the housing to a metallic surface. Preferably, the magnet is permanently secured within a casing 17. Attached to the top wall of the housing is a second substantially rectangular ferromagnetic casing 13. The casing includes a pair of lateral and a pair of longitudinal side walls. Removably received within the casing 13 is a second, substantially rectangular magnet 8 having planar upper and lower surfaces with two lateral and two longitudinal edges therebetween and a slit 9 on the upper surface thereof. A lateral edge of the magnet has an arcuate portion 10 for receiving a user's fingers allowing the magnet to be easily removed from the casing 13. The slit 9 is dimensioned to securely receive the L-shaped catch member 5 on the first end of the tape measure allowing a user to magnetically secure a first end of the tape to a metallic surface. The removable magnet 8 allows the L-shaped catch member to be secured in the conventional manner as well when measuring non-metallic objects.

Received within the housing adjacent a side edge of the tape proximal the horizontal slot 2 is a ratcheting pawl mechanism 10 of the type generally known in the prior art. The ratcheting pawl mechanism 10 includes an elongated spring biased arm 12 having a tip portion 11 that rides on the upper surface of the tape measure.

Within a predetermined distance of the second end of the tape measure are a plurality of longitudinally aligned apertures 15 along a side edge thereof. The apertures 15 are dimensioned to selectively receive the tip portion 11 of the spring biased arm 12. Accordingly, as the tape measure is extended to a length approaching its maximum, the spring biased arm 12 will begin reciprocating as its tip portion successively seats within and is displaced from each aperture. As the spring biased arm reciprocates, the ratcheting mechanism in communication therewith will emit a clicking noise. The clicking noise emitted by the ratcheting mechanism will audibly indicate that the tape has been extended a predetermined distance. The elongated arm 12 is biased such as to not completely impede the tape retraction mechanism thereby allowing the tape to be easily retracted if desired.

The above described device is not to be limited to the exact details of construction enumerated above. The housing according to the present invention is preferably constructed with plastic, metal or any other suitable equivalent thereof. A logo or similar design element may be embossed or imprinted on a sidewall of the housing. However, as will be readily apparent to those skilled in the art, the shape, size, materials of construction and color of the various components may be varied without departing from the spirit of the present invention. The spring biased, pawl ratcheting mechanism described above is of the type generally known in the prior art and therefore has not been shown and described in explicit detail.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A magnetic tape measure assembly comprising:

a substantially hollow housing having an exterior surface with a slot thereon;

a tape measure scrollably received within said housing and selectively extendable and retractable through said slot, said tape measure having an upper surface, two opposing side edges, a first end and a second end with an L-shaped catch member at the first end thereof;

an internal deployment warning means received within said housing for audibly alerting a user when the tape measure has been extended a predetermined length wherein said internal deployment warning means includes a spring biased arm received within said housing having a tip portion resting on the upper surface of said tape measure;

a plurality of apertures positioned a predetermined distance from the second end of the tape measure, each aperture dimensioned to selectively receive the tip portion of the spring biased arm causing said arm to reciprocate into and out of said apertures as said tape is extended; and a ratcheting mechanism in communication with said spring biased arm whereby said ratchet mechanism will emit an audible noise as said arm reciprocates to audibly notify a user that the tape has been extended the predetermined length.

2. A magnetic tape measure according to claim 1 wherein said housing further includes a bottom wall having a first magnet attached thereto for magnetically securing said housing to a metallic surface.

3. A magnetic tape measure according to claim 1 wherein said housing further includes a top wall having a second magnet removably attached thereto for selectively retaining said L-shaped catch member.

4. A magnetic tape measure according to claim 3 wherein said second magnet includes a slit on an intermediate portion thereof for receiving the L-shaped catch member on said tape measure.

5. A magnetic tape measure according to claim 3 wherein said second magnet further includes an arcuate portion at an end thereof for receiving a user's finger allowing the magnet to be easily removed from the top wall of the housing.

6. A magnetic tape measure according to claim 3 wherein said second magnet is removably received within a casing, said casing attached to the top wall of said housing.

7. A magnetic tape measure according to claim 1 wherein said tape measure further comprises a plurality of measurement indicia on the upper surface thereof.

* * * * *